METHOD FOR MAKING AN ELECTRICAL CAPACITOR

Filed Dec. 30, 1963

2 Sheets-Sheet 1

INVENTOR.
JOHANN G. DILL,
BY
Paul M. Coble
ATTORNEY.

METHOD FOR MAKING AN ELECTRICAL CAPACITOR

Filed Dec. 30, 1963

INVENTOR.
JOHANN G. DILL,
BY
Paul M. Coble
ATTORNEY.

United States Patent Office 3,326,718

Patented June 20, 1967

3,326,718

METHOD FOR MAKING AN ELECTRICAL CAPACITOR

Johann G. Dill, Costa Mesa, Calif., assignor to Hughes Aircraft Company, Culver City, Calif., a corporation of Delaware Filed Dec. 30, 1963, Ser. No. 334,322
13 Claims. (Cl. 117—212)

This invention relates to electrical capacitors, and more particularly relates to a method for making a multi-layer thin-film electrical capacitor in a single vacuum operation without moving parts in the vacuum chamber. The invention also relates to capacitors produced by this method.

A recent problem in the electronic industry, and especially in the microminiaturized circuitry art, is that of providing large capacitances in a minimum amount of space. One technique which has been used in order to minimize the opposing conductive surface area required for a give capacitance is to use an insulating material having a high dielectric constant. The drawback with this approach, however, is that such capacitors are not always reliable and are subject to excessive losses under high frequency operation. Another approach to the problem is to employ a multi-layer capacitor, i.e., a capacitor having at least three parallel layers of electrically conductive material with both broad surfaces of the intermediate layer or layers being utilized to furnish the capacitance. However, in the past the fabrication of multi-layer thin-film capacitors has been a relatively involved task, requiring either a separate vacuum deposition operation for each layer or complex apparatus with several moving parts.

Accordingly, it is a principal object of the present invention to provide a method for making a multi-layer electrical capacitor in a single vacuum operation without moving parts in the vacuum chamber.

It is a further object of the present invention to provide a simple, reliable and efficient vapor deposition technique compatible with thin-film technology for fabricating a multi-layer thin-film electrical capacitor.

It is a further object of the present invention to provide a thin-film electrical capacitor consisting of inter-leaved layers of conductive material and in which any tendency for undesired short-circuiting between oppositing conductive layers is greatly reduced.

It is a still further object of the present invention to provide a vapor deposited thin-film electrical capacitor in which a large capacitance is achieved without the use of high dielectric constant material.

Briefly, in accordance with the method of the present invention to fabricate an electrical capacitor, first a vapor of electrically conductive material is produced at a first location in a vacuum environment, with an apertured mask disposed between the first location and a carrier surface. Vapor from the first location passes through the aperture in the mask and deposits over a first region of the carrier surface. Next, a vapor of insulating material is produced at a second location in the vacuum environment such that vapor from the second location passes through the aperture and deposits over a second region of the carrier surface different from and overlapping the first region. Then, vapor of electrically conductive material is produced at a third location in the vacuum environment such that vapor from the third location passes through the aperture and deposits over a third region of the carrier surface different from and overlapping the first and second regions.

By continuing the foregoing steps in a predetermined sequence, multi-layer capacitors having a desired number of layers may be fabricated. The predetermined sequence involves alternately energizing the vapor sources of conductive material at the first and third locations, while energizing the insulating vapor source between each energization of a conductive material source.

Electrical capacitors according to the present invention include a first layer of electrically conductive material, a layer of insulating material of substantially the same shape and area as the electrically conductive layer disposed substantially on the conductive layer with every point on the perimeter of the insulating layer laterally displaced with respect to a corresponding point on the perimeter of the conductive layer, and a second layer of electrically conductive material of substantially the same shape and area as the insulating layer disposed substantially on the insulating layer with every point on the perimeter of the second electrically conductive layer laterally displaced with respect to a corresponding point on the perimeter of the insulating layer in the same direction as that in which the insulating layer is displaced with respect to the first conductive layer.

Multi-layer capacitors of the present invention possess two laterally offset groups of electrically conductive layers having substantially portions disposed parallel to one another. The layers of one group are laterally coextensive with one another and make electrical contact along at least one edge of the capacitor, while the electrically conductive layers of the other group are laterally coextensive with one another and make electrical contact along the opposite edge of the capacitor. The electrically conductive layers of each group are insulated from the electrically conductive layers of the other group by a continuous path of contacting insulating layers interleaved between the conductive layers.

Additional objects, advantages, and characteristic features of the present invention will become readily apparent from the following detailed description of preferred embodiments of the invention when considered in conjunction with the accompanying drawings in which.

Figure 1:
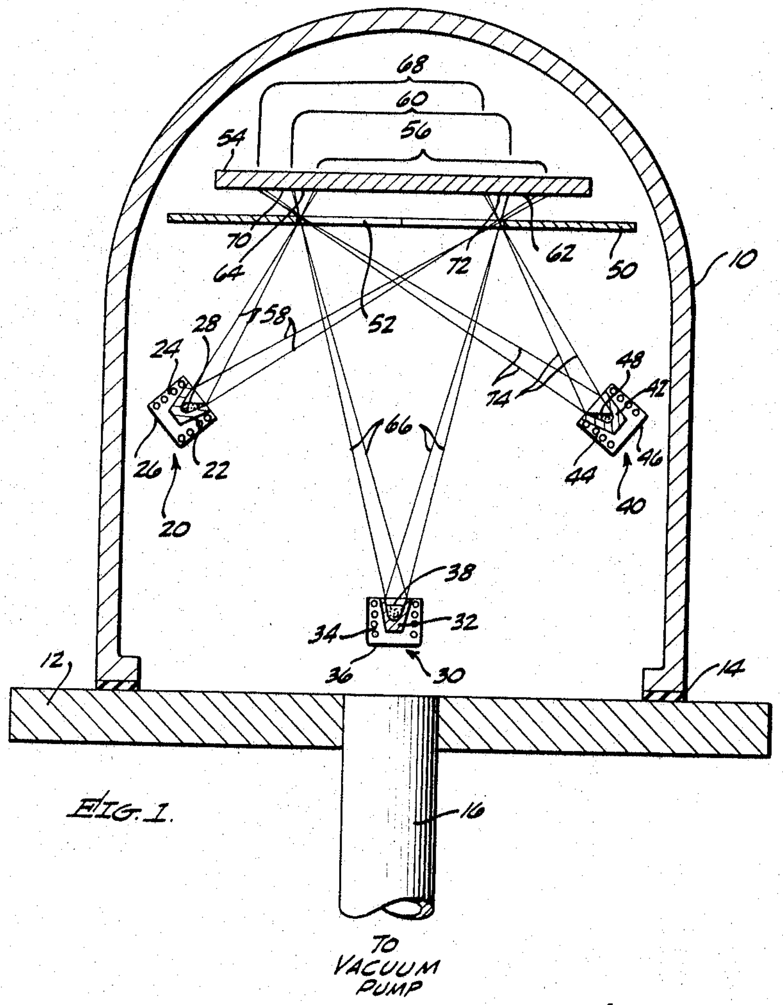
FIG. 1 is a sectional side view illustrating apparatus used in carrying out the method of the present invention.

Referring to FIG. 1 with more particularity, there is shown apparatus which may be employed to fabricate electrical capacitors in accordance with the present invention. This apparatus includes a vacuum chamber consisting of a bell jar 10 of glass or the like, mounted on a metal base 12 by means of a rubber gasket 14. A conduit 16 passing through the base 12 and connected to a vacuum pump (not shown) enables the chamber to be evacuated to a desired pressure.

Mounted in the vacuum chamber are three coplanar independently energizable sources 20, 30 and 40, respectively, of vaporizable material used to form the capacitor layers. The sources 20, 30 and 40 comprise respective dispensing vessels, or crucibles, 22, 32 and 42 of quartz or beryllium oxide, for example. Heating coils 24, 34 and 44, each connected to a suitable source of electrical potential (not shown) and adapted to be independently energized are disposed about the respective crucibles 22, 32 and 42. Shields 26, 36 and 46 of a highly reflective metal are disposed about the respective heaters 24, 34 and 44 in order to concentrate the heat on the respective crucibles disposed within. The crucible 22 is adapted to contain particles 28 of a vaporizable metal such as gold or aluminum; the dispensing vessel 32 may contain particles 38 of an insulating dielectric material such as silicon monoxide; while metal particles 48, which may be either the same as the metal 28 or a different metal, are provided within the crucible 42.

Figure 2:
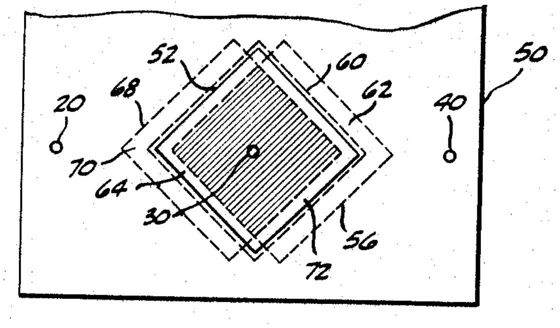
FIG. 2 is a plan view illustrating portions of the apparatus of FIG. 1 including the vapor sources, mask, and capacitor layers being formed.

A masking plate 50, which may be of stainless steel for example, is mounted above the vapor sources 20, 30 and 40 in a plane parallel to the base plate 12 by suitable mounting means (not shown). The mask 50 defines an aperture 52 which, as is illustrated in FIG. 2, is of square shape. As will become more apparent as the description proceeds, the shape of the aperture 52 determines the shape of the respective layers of the capacitor being fabricated and, while a square aperture is shown, it is pointed out that the aperture 52 may be of almost any shape including non-square rectangles and other polygons, the only limitation being that no side of the figure defined by the mask aperture be disposed parallel to the plane containing the vapor sources. A square aperture is preferred, however, since this geometry affords optimum surface area utilization while minimizing any tendency for undesired short-circuiting between neighboring conductive layers in the resultant capacitor.

The vapor sources 20, 30 and 40 are mounted by means (not shown) in a plane passing through a diagonal of the square aperture 52 in the mask 50 and perpendicular to the plane containing the mask 50. The crucibles 22, 32 and 42 are disposed so that their open ends face the aperture 52 in the mask 50, with the openings in the respective crucibles being substantially smaller than the distance from the crucibles to the aperture 52 so as to approximate a point source. At the same time, the crucible openings are sufficiently large to allow ready vapor flow therethrough.

A carrier surface 54 of glass or quartz, for example, on which the capacitor is to be deposited is supported by means (not shown) above the mask 50 in a plane parallel to the plane of the mask 50 with its central regions located above the aperture 52. The distance between the mask 50 and the carrier surface 54 is preferably around 2 mils.

In the operation of the apparatus described above to fabricate electrical capacitors in accordance with the method of the present invention, the metals 28 and 48 and the insulating material 38 to be vaporized are placed in the respective crucibles 22, 42, and 32, and the element 54 which is to receive the evaporated capacitor layers is inserted in its place within the vacuum chamber. The bell jar 10 is then placed on the chamber base plate 12, and the chamber is evacuated to a desired pressure which may be of the order of $10^{-6}$ torr. As the chamber becomes evacuated the gasket 14 affords a vacuum-tight seal between the bell jar 10 and the base 12.

When it is desired to commence the vaporizing operation, the heater 24 of the source 20 is energized to vaporize the metal 28 contained in the crucible 22. Metal vapors from the crucible 22 travel upwardly through the aperture 52 in the mask 50 and deposit on a portion of the lower surface of the element 54, with the perimeter of the deposited metal film being indicated by the dashed lines 56 of FIG. 2. A rounding off occurs at the edges of the deposited coating 56 (see FIG. 4) because less material reaches the edge vicinity than the central regions of the deposited film. This rounding off is caused by primary scattering due to the finite opening of the crucible 22, and also on account of secondary scattering due to the finite thickness of the aperture 52 in the mask 50. The degree of primary scattering is a function of the size of the crucible opening, the distance between the crucible 22 and the aperture 52, and the distance between the aperture 52 and the surface 54. This scattering effect, which is illustrated by the vapor flow guide lines 58 between the crucible 22 and the surface 54, may be minimized by minimizing the size of the crucible opening relative to the crucible-mask distance, and maximizing the ratio of crucible-mask distance to mask-carrier surface distance. After sufficient metal from the source 20 has deposited onto the surface 54 to form a film 56 of the desired thickness, which may be from 0.05 to 1.0 micron for example, the heating coil 24 is de-energized.

After sufficient time has elapsed for evaporation from the source 20 to cease altogether, the heater 34 of the source 30 is energized to vaporize the insulating material 38 contained in the crucible 32. Insulating vapors then travel upwardly through the aperture 52 in the mask 50 and deposit substantially on the metal film 56 previously formed on the surface 54 to form an insulating layer 60 (shown in dashed line in FIG. 2) thereon. On account of the different locations of the insulating source 30 and the metal source 20, different portions of the surface 54 are exposed to vapor deposit from the source 30 than from the source 20. Thus, the insulating layer 60 is laterally offset with respect to the metal layer 56, with a portion 62 of the metal layer 56 remaining uncovered, and a portion 64 of the insulating layer 60 impinging directly upon the lower surface of the carrier 54. The extent of the offset, i.e. the width of the portions 62 or 64, should be at least ten times greater than the thickness of the insulating layer 60. Again, a rounding off of the edges of the insulating layer 60 occurs (see FIG. 4) on account of the aforementioned scattering effects depicted by the insulating vapor flow guide lines 66 between the crucible 32 and the surface 54. After sufficient insulating material has been deposited to provide an insulating layer 60 of the desired thickness, for example from 0.1 to 0.5 micron, the heater 34 is de-energized to cease vapor flow from the source 30.

After the heater 34 has cooled sufficiently, the heating coil 44 of the source 40 is energized to vaporize the metal 48 contained in the crucible 42. Metal vapors from the crucible 42 then travel through the aperture 52 in the mask 50 to form a second metal film 68 (shown in dashed line in FIG. 2) substantially on the insulating layer 60. Again, on account of the location of the source 40, the surface area on which the metal layer 68 is deposited is laterally displaced with respect to the metal layer 56 and the insulating layer 60, the lateral displacement of the metal layer 68 with respect to the insulating layer 60 preferably being the same amount as the aforementioned lateral displacement of the insulating layer 60 with respect to the metal layer 56. Thus, a portion 70 of the second metal layer 68 impinges directly upon the carrier surface 54, while a portion 72 of the insulating layer 60 is left exposed. The edges of the second metal layer 68 are rounded off in the manner described above with respect to the layers 56 and 60 on account of the aforementioned scattering effects depicted by the vapor flow guide lines 74 between the crucible 42 and the surface 54. When sufficient metal vapor has been deposited to provide a desired thickness for the film 68, which may be the same thickness as that of the first metal film 56, the heating coil 44 for the source 40 is de-energized to cease vapor flow from the crucible 42.

The steps described thus far may be employed to produce a thin-film capacitor having laterally offset conductive layers 56 and 68 separated by an intermediately offset insulating layer 60 (see (FIG. 4), and which capacitor provides a capacitance of $C_1$. In accordance with the present invention the foregoing steps may be repeated in the sequence now to be described to produce multi-layer capacitors having capacitances substantially equal to $nC_1$, where $n$ is an integer greater than one.

In order to produce a multi-layer capacitor providing a capacitance of $2C_1$, the foregoing sequence would be continued as follows. After de-energization of the metal vapor source 40, the insulating vapor source 30 is energized to deposit a second insulating film 60' (FIG. 4) substantially over the second metal layer 68. Since the location of the source 30 is the same as it was during the formation of the first insulating layer 60, the second insulating layer 60' covers the same lateral surface area as the layer 60 and defines a portion which is deposited on the exposed portion 72 of the first insulating layer 60. Subsequently, the metal vapor source 20 is energized to deposit a third metal layer 56' substantially over the second insulating layer 60'. The source 20 occupies the same position as that which it had during the formation of the first metal layer 56, and hence the lateral extent of the third metal layer 56' is the same as that of the first metal layer 56. Thus, the metal layer 56' possesses a portion which is deposited over the exposed portion 62 of the first metal layer 56 and which makes electrical contact therewith as shown at 62. It should be apparent that the third metal layer 56' becomes automatically electrically connected to the first metal layer 56, with the region of connection of the metal layers 56 and 56' being electrically insulated from the intermediate metal layer 68 by means of the projecting portions 72 of the insulating layers 60 and 60'. Since the addition of the layer 56' provides an opposing metal surface area substantially twice that of the structure comprising the metal layers 56 and 68 only, the 3-metal layer capacitor furnishes a capacitance substantially equal to $2C_1$.

In continuing the sequence in order to provide a multilayer capacitor having a capacitance of $3C_1$, the insulating vapor source 30 is then energized to form a third insulating layer 60'' of the same lateral extent as the insulating layers 60 and 60' substantially over the third metal layer 56'. The third insulating layer 60'' has a portion which deposits over the exposed portion of the second insulating layer 60' to make contact therewith at the surface 74. Next, the metal vapor source 40 is again energized to deposit a fourth metal layer 68' of the same lateral extent as the second metal layer 68 substantially over the third insulating layer 60''. The fourth metal layer 68' defines a portion which deposits on the exposed portion of the second metal layer 68 to make electrical contact therewith at 76. Thus, electrical connection of the metal layers 68 and 68' is automatically provided, with the region of interconnection of these layers being insulated from the intermediate metal layer 56' by means of the contacting portions 74 of the insulating layers 60' and 60''.

Figure 3:
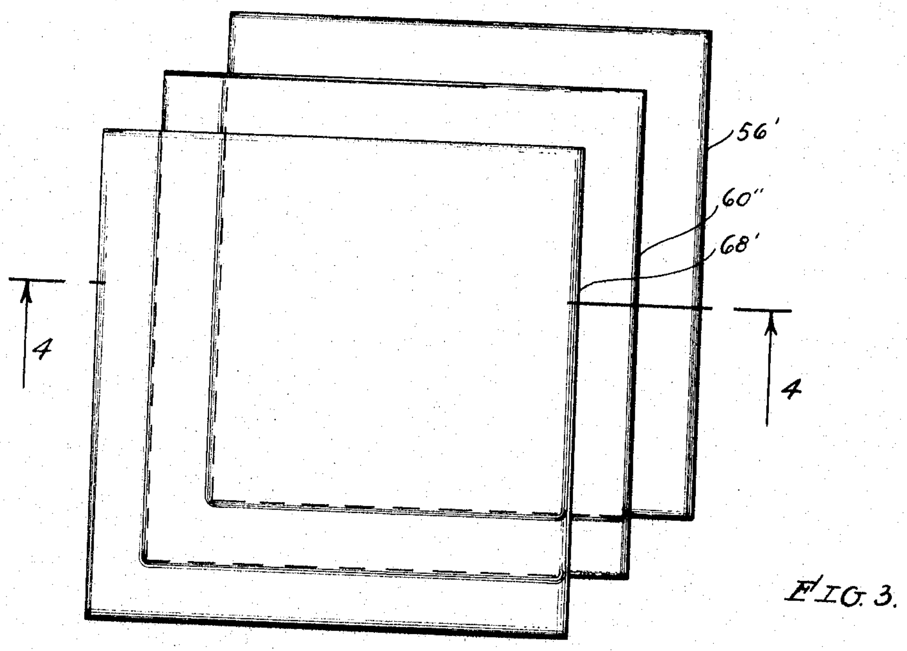
FIG. 3 is a plan view of a multi-layer capacitor provided according to the present invention.
Figure 4:
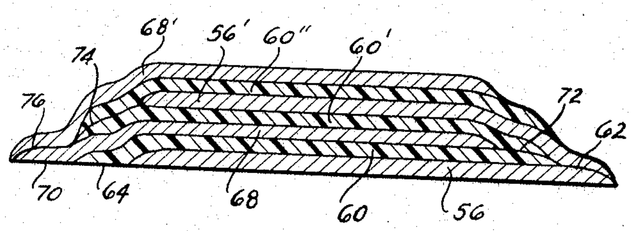
FIG. 4 is a sectional view taken along line 4—4 of FIG. 3.

The resulting capacitor is illustrated in FIGS. 3 and 4 and possesses a capacitance substantially equal to $3C_1$. It is pointed out, however, that the structure shown in FIG. 4 was chosen solely for illustrative purposes, and the method of the present invention is in no way limited to producing capacitors having four electrically conductive layers, but rather the method may be employed to produce capacitors having any number of conductive layers, the number being limited by the size requirements of the particular application involved and of the apparatus used in fabricating the capacitor. The sequence required in forming a multi-layer capacitor according to the present invention is simply to alternately activate the metal vapor sources 20 and 40, while activating the insulating vapor source 30 between each energization of a metal vapor source.

After a thin-film capacitor having the desired number of layers has been formed, the vacuum chamber is returned to atmospheric pressure; the bell jar 10 is lifted; and the fabricated capacitor is removed from the apparatus.

It may be observed that multi-layer capacitors according to the present invention possess two laterally offset groups of electrically conductive layers having substantial portions disposed parallel to one another, with the layers 56, 56' of one group making electrical contact with one another adjacent two edges of the capacitor and the electrically conductive layers 68, 68' of the other group making electrical contact with one another adjacent the two opposite edges of the capacitor so that each group functions as a capacitor plate. The electrically conductive layers of each group are insulated from the electrically conductive layers of the other group by means of the contacting insulating layers 60, 60' and 60'' which interleave a continuous path of insulation between the conductive layers. Electrical connection to external leads may be readily afforded by connecting the external leads to the projecting portions of the respective groups of conductive layers.

It should be appreciated that in the method of the present invention all the capacitor layers are formed in a single vacuum operation and without moving parts in the vacuum chamber. Moreover, alternate conductive layers are automatically electrically connected to one another during the vapor deposition operations, thereby eliminating any additional connecting elements, as well as welding, brazing, or soldering operations. In addition, a structure is produced which possesses a continuous path of insulation between all portions of the conductive surfaces between which it is desired to prevent short-circuiting.

It is further pointed out that the principles of the present invention may be utilized to produce electrical components other than capacitors. For example, thin-film diodes may be fabricated by utilizing semi-insulator material, such as cadmium sulfide, instead of the insulator material to produce the layers 60, 60' and 60'' and by selecting metals with respective lower and higher work functions than the work function of the semi-insulator material for the layers 56, 56' and 68, 68'.

Thus, many modifications and variations of the present invention are possible in the light of the above teachings, and it is to be understood that the invention may be practiced otherwise than as specifically described and nevertheless lie within the spirit and scope of the appended claims.

What is claimed is:

1. A method for making an electrical device comprising the steps of: producing a vapor of material having a first electrical conductivity at a first location in a vacuum environment with an apertured mask disposed between said first location and a carrier surface such that vapor from said first location passes through the aperture in said mask and deposits over a first region of said carrier surface, producing a vapor of a material having second electrical conductivity different from said first electrical conductivity at a second location in said vacuum environment such that vapor from said second location passes through said aperture and deposits over a second region of said carrier surface different from and overlapping said first region, and producing a vapor of a material having an electrical conductivity different from said second electrical conductivity at a third location in said vacuum environment coplanar with said first and second locations in a plane at least substantially perpendicular to the plane containing said mask and such that vapor from said third location passes through said aperture and deposits over a third region of said carrier surface different from and overlapping said first and second regions.

2. A method for making an electrical device comprising the steps of: producing a vapor of a material having a first electrical conductivity at a first location in a vacuum environment with a mask defining a substantially rectangular aperture disposed between said first location and a carrier surface such that vapor from said first location passes through said aperture and deposits over a first region of said carrier surface, producing a vapor of a material having a second electrical conductivity different from said first electrical conductivity at a second location in said vacuum environment lying in a plane passing through said first location and a diagonal of said rectangular aperture and being such that vapor from said second location passes through said aperture and deposits over a second region of said carrier surface different from and overlapping said first region, and producing a vapor of a material having an electrical conductivity different from said second electrical conductivity at a third location in said vacuum environment lying in said plane and being such that vapor from said third location passes through said aperture and deposits over a third region of said carrier surface different from and overlapping said first and second regions.

3. A method for making an electrical device comprising the steps of: energizing a first substantially point source of a vapor of a material having a first electrical conductivity at a first location in a vacuum environment with an apertured mask disposed between said first source and a carrier surface such that vapor from said first source passes through said aperture and deposits over a first region of said carrier surface; without moving said mask and said carrier surface energizing a second substantially point source of a vapor of a material having a second electrical conductivity different from said first electrical conductivity at a second location in said vacuum environment such that vapor from said second source passes through said aperture and deposits over a second region of said carrier surface different from and overlapping said first region; without moving said mask and said carrier surface energizing a third substantially point source of a vapor of a material having an electrical conductivity different from said second electrical conductivity at a third location in said vacuum environment such that vapor from said third source passes through said aperture and deposits over a third region of said carrier surface different from and overlapping said first and second regions; and without moving said mask and said carrier surface successively energizing selected ones of said first, second, and third sources in a predetermined sequence to deposit vapor therefrom over said first, second, and third regions, respectively.

4. A method for making an electrical capacitor comprising the steps of: producing a vapor of electrically conductive material at a first location in a vacuum environment with an apertured mask disposed between said first location and a carrier surface such that vapor from said first location passes through the aperture in said mask and deposits over a first region of said carrier surface, producing a vapor of insulating material at a second location in said vacuum environment such that vapor from said second location passes through said aperture and deposits over a second region of said carrier surface different from and overlapping said first region, and producing a vapor of electrically conductive material at a third location in said vacuum environment coplanar with said first and second locations in a plane at least substantially perpendicular to the plane containing said mask and such that vapor from said third location passes through said aperture and deposits over a third region of said carrier surface different from and overlapping said first and second regions.

5. A method for making an electrical capacitor comprising the steps of: producing a vapor of electrically conductive material at a first location in a vacuum environment with an apertured mask disposed between said first location and a carrier surface such that vapor from said first location passes through the apertures in said mask and deposits over a first region of said carrier surface, producing a vapor of insulating material at a second location in said vacuum environment such that vapor from said second location passes through said aperture and deposits over a second region of said carrier surface different from and overlapping said first region, producing a vapor of electrically conductive material at a third location in said vacuum environment coplanar with said first and second locations in a plane at least substantially perpendicular to the plane containing said mask and such that vapor from said third location passes through said aperture and deposits over a third region of said carrier surface different from and overlapping said first and second regions, producing a vapor of insulating material at said second location whereby vapor from said second location deposits over said second region of said carrier surface, and producing a vapor of electrically conductive material at said first location whereby vapor from said first location deposits over said first region of said carrier surface.

6. A method for making an electrical capacitor comprising the steps of: producing a vapor of electrically conductive material at a first location in a vacuum environment with an apertured mask disposed between said first location and a carrier surface such that vapor from said first location passes through the aperture in said mask and deposits over a first region of said carrier surface, producing a vapor of insulating material at a second location in said vacuum environment such that vapor from said second location passes through said aperture and deposits over a second region of said carrier surface different from and overlapping said first region, producing a vapor of electrically conductive material at a third location in said vacuum environment coplanar with said first and second locations in a plane at least substantially perpendicular to the plane containing said mask and such that vapor from said third location passes through said aperture and deposits over a third region of said carrier surface different from and overlapping said first and second regions, producing a vapor of insulating material at said second location whereby vapor from said second location deposits over said second region of said carrier surface, producing a vapor of electrically conductive material at said first location whereby vapor from said first location deposits over said first region of said carrier surface, producing a vapor of insulating material at said second location whereby vapor from said second location deposits over said second region of said carrier surface, and producing a vapor of electrically conductive material at said third location whereby vapor from said third location deposits over said third region of said carrier surface.

7. A method for making an electrical device comprising the steps of: producing a vapor of a material having a first electrical conductivity at a first location in a vacuum environment with a mask defining a substantially polygonal aperture disposed between said first location and a carrier surface such that vapor from said first location passes through said aperture and deposits over a first region of said carrier surface, producing a vapor of a material having a second electrical conductivity different from said first electrical conductivity at a second location in said vacuum environment lying in a plane passing through said first location and a diagonal of said polygonal aperture and being such that vapor from said second location passes through said aperture and deposits over a second region of said carrier surface different from and overlapping said first region, and producing a vapor of a material having an electrical conductivty different from said second electrical conductivity at a third location in said vacuum environment lying in said plane and being such that vapor from said third location passes through said aperture and deposits over a third region of said carrier different from and overlapping said first and second regions.

8. A method for making an electrical capacitor comprising the steps of: producing a vapor of electrically conductive material at a first location in a vacuum environment with a mask defining a substantially polygonal aperture disposed between said first location and a carrier surface such that vapor from said first location passes through said aperture and deposits over a first region of said carrier surface, producing a vapor of insulating material at a second location in said vacuum environment lying in a plane passing through said first location and a diagonal of said polygonal aperture and being such that vapor from said second location passes through said aperture and deposits over a second region of said carrier surface different from and overlapping said first region, and producing a vapor of electrically conductive material at a third location in said vacuum environment lying in said plane and being such that vapor from said third location passes through said aperture and deposits over a third region of said carrier surface different from and overlapping said first and second regions.

9. A method for making an electrical capacitor comprising the steps of: producing a vapor of electrically conductive material at a first location in a vacuum environment with a mask defining a substantially polygonal aperture disposed between said first location and a carrier surface such that vapor from said first location passes through said aperture and deposits over a first region of said carrier surface, producing a vapor of insulating material at a second location in said vacuum environment lying in a plane passing through said first location and a diagonal of said polygonal aperture and being such that vapor from said second location passes through said aperture and deposits over a second region of said carrier surface different from and overlapping said first region, producing a vapor of electrically conductive material at a third location in said vacuum environment lying in said plane and being such that vapor from said third location passes through said aperture and deposits over a third region of said carrier surface different from and overlapping said first and second regions, producing a vapor of insulating material at said second location whereby vapor from said second location deposits over said second region of said carrier surface, and producing a vapor of electrically conductive material at said first location whereby vapor from said first location deposits over said first region of said carrier surface.

10. A method for making an electrical capacitor comprising the steps of: producing a vapor of electrically conductive material at a first location in a vacuum environment with a mask defining a substantially polygonal aperture disposed between said first location and a carrier surface such that vapor from said first location passes through said aperture and deposits over a first region of said carrier surface, producing a vapor of insulating material at a second location in said vacuum environment lying in a plane passing through said first location and a diagonal of said polygonal aperture and being such that vapor from said second location passes through said aperture and deposits over a second region of said carrier surface different from and overlapping said first region, producing a vapor of electrically conductive material at a third location in said vacuum environment lying in said plane and being such that vapor from said third location passes through said aperture and deposits over a third region of said carrier surface different from and overlapping said first and second regions, producing a vapor of insulating material at said second location whereby vapor from said second location deposits over said second region of said carrier surface, producing a vapor of electrically conductive material at said first location whereby vapor from said first location deposits over said first region of said carrier surface, producing a vapor of insulating material at said second location whereby vapor from said second location deposits over said second region of said carrier surface, and producing a vapor of electrically conductive material at said third location whereby vapor from said third location deposits over said third region of said carrier surface.

11. A method for making an electrical capacitor comprising the steps of: energizing a first substantially point source of a vapor of electrically conductive material at a first location in a vacuum environment with an apertured mask disposed between said first source and a carrier surface such that vapor from said first source passes through the aperture in said mask and deposits over a first region of said carrier surface, without moving said mask and said carrier surface energizing a second substantially point source of a vapor of insulating material at a second location in said vacuum environment such that vapor from said second source passes through said aperture and deposits over a second region of said carrier surface different from and overlapping said first region, and without moving said mask and said carrier surface energizing a third substantially point source of a vapor of electrically conductive material at a third location in said vacuum environment such that vapor from said third source passes through said aperture and deposits over a third region of said carrier surface different from and overlapping said first and second regions.

12. A method for making an electrical capacitor comprising the steps of: energizing a first substantially point source of a vapor of electrically conductive material at a first location in a vacuum environment with an apertured mask disposed between said first source and a carrier surface such that vapor from said first source passes through the aperture in said mask and deposits over a first region of said carrier surface, without moving said mask and said carrier surface energizing a second substantly point source of a vapor of insulating material at a second location in said vacuum environment such that vapor from said second source passes through said aperture and deposits over a second region of said carrier surface different from and overlapping said first region, without moving said mask and said carrier surface energizing a third substantially point source of a vapor of electrically conductive material at a third location in said vacuum environment such that vapor from said third source passes through said aperture and deposits over a third region of said carrier surface different from and overlapping said first and second regions, without moving said mask and said carrier surface energizing said second source whereby vapor of insulating material from said second source deposits over said second region of said carrier surface, and without moving said mask and said carrier surface energizing said first source whereby vapor of electrically conductive material from said first source deposits over said first region of said carrier surface.

13. A method for making an electrical capacitor comprising the steps of: energizing a first substantially point source of a vapor of electrically conductive material at a first location in a vacuum environment with an apertured mask disposed between said first source and a carrier surface such that vapor from said first source passes through the aperture in said mask and deposits over a first region of said carrier surface, without moving said mask and said carrier surface energizing a second substantially point source of a vapor of insulating material at a second location in said vacuum environment such that vapor from said second source passes through said aperture and deposits over a second region of said carrier surface different from and overlapping said first region, without moving said mask and said carrier surface energizing a third substantially point source of a vapor of electrically conductive material at a third location in said vacuum environment such that vapor from said third source passes through said aperture and deposits over a third region of said carrier surface different from and overlapping said first and second regions, without moving said mask and said carrier surface energizing said second source whereby vapor of insulating material from said second source deposits over said second region of said carrier surface, without moving said mask and said carrier surface energizing said first source whereby vapor of electrically conductive material from said first source deposits over said first region of said carrier surface, without moving said mask and said carrier surface energizing said second source whereby vapor of insulating material from said second source deposits over said second region of said carrier surface, and without moving said mask and said carrier surface energizing said third source whereby vapor of electrically conductive material from said third source deposits over said third region of said carrier surface.

References Cited

UNITED STATES PATENTS

| | | | |
|---|---|---|---|
| 2,627,645 | 2/1953 | Harris | 29—25.42 |
| 2,740,928 | 4/1956 | Ward | 117—107 X |
| 2,915,808 | 12/1959 | Clemons | 29—25.42 |
| 2,994,621 | 8/1961 | Hugle et al. | 117—201 |
| 3,014,167 | 12/1961 | Winter | 317—260 |
| 3,090,895 | 4/1963 | Hall | 317—260 |
| 3,148,085 | 9/1964 | Wiegmann | 117—212 |
| 3,244,557 | 4/1966 | Chiou et al. | 117—212 |

FOREIGN PATENTS

| | | |
|---|---|---|
| 924,858 | 5/1963 | Great Britain. |

ALFRED L. LEAVITT, *Primary Examiner.*

WILLIAM L. JARVIS, JOHN F. BURNS, *Examiners.*

E. GOLDBERG, *Assistant Examiner.*